No. 12,185. REISSUED DEC. 22, 1903.
F. R. McBERTY.
CONNECTION COUNTER FOR TELEPHONE LINES.
APPLICATION FILED NOV. 21, 1902.
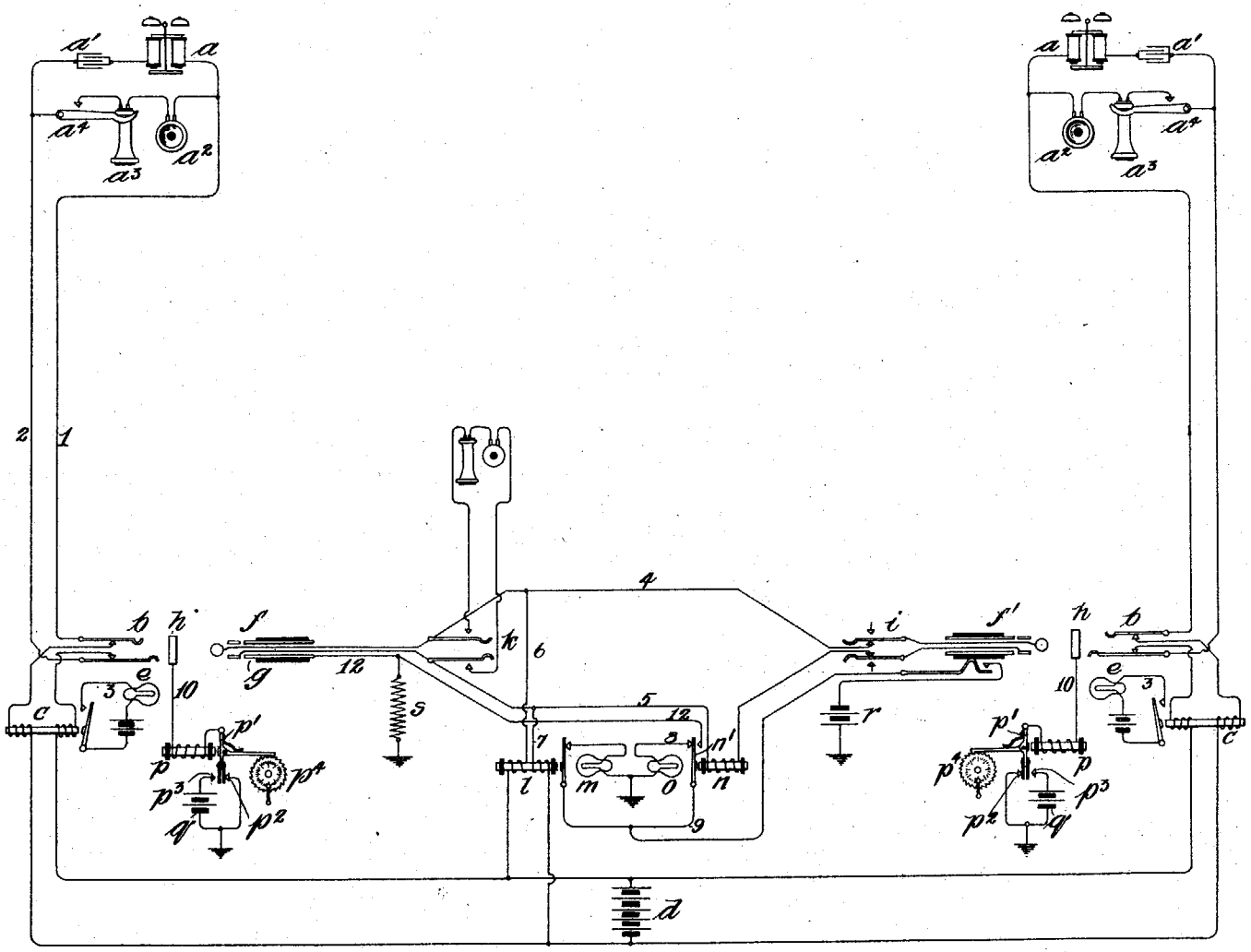
Witnesses:
J. W. Skinkle,
W. A. Leach
Inventor:
Frank R. McBerty
By Geo. P. Barton
Attorney.
THE NORRIS PETERS CO., WASHINGTON, D. C.

No. 12,185. Reissued December 22, 1903.

UNITED STATES PATENT OFFICE.

FRANK R. McBERTY, OF EVANSTON, ILLINOIS, ASSIGNOR TO THE WESTERN ELECTRIC COMPANY, OF CHICAGO, ILLINOIS, A CORPORATION OF ILLINOIS.

CONNECTION-COUNTER FOR TELEPHONE-LINES.

SPECIFICATION forming part of Reissued Letters Patent No. 12,185, dated December 22, 1903.

Original No. 641,400, dated January 16, 1900. Application for reissue filed November 21, 1902. Serial No. 132,346.

*To all whom it may concern:*

Be it known that I, FRANK R. McBERTY, a citizen of the United States, residing at Evanston, in the county of Cook and State of Illinois, have invented a certain new and useful Improvement in Connection-Counters for Telephone-Lines, of which the following is a full, clear, concise, and exact description.

The invention concerns the registering or counting of the uses of the substation-telephone for the purpose of basing a charge on such use. It is designed to count only completed connections which attain response at the called station. The invention consists in the combination with two telephone-lines, means for uniting them, and means for determining the flow of current in one of the lines in the use of the telephone, of counting or registering mechanism, and an electromagnet for actuating it, the electromagnet being responsive to or controlled through the agency of the current produced in the called line by the use of the telephone at the station thereof.

The invention may be readily applied in exchange systems in which signals associated with the lines in a switchboard are operated incidentally in the use of the station-telephones, responding to currents controlled in the lines through the opening or closing of switches moved in the use of the telephones. In an ordinary type of such system a battery or other source of current is applied to each telephone-line. The line-circuit is normally interrupted at the substation as to continuous currents, but is closed by the telephone-switch when the receiving-telephone is removed from it for use. In associating the present invention with such a system the counter-controlling electromagnet may be so connected with the link conductors for uniting lines as to be brought into circuit with the called line and to receive current from a source when the telephone at the correspondent station is in use. The counting mechanism may be controlled by this magnet through the medium of an additional magnet in a local circuit permanently associated with the calling-line. A device is provided whereby this latter magnet is permitted to respond and exercises its function only once during each connection, its circuits being changed in its first act to prevent its subsequent operation in order that it may not count the same use of the telephone more than once.

The attached drawing represents this invention in conjunction with a switchboard and automatically-operated signals therein of the type mentioned.

The apparatus at the substation comprises the usual polarized signal-bell $a$ in a closed bridge of the line, together with a condenser $a'$ for interrupting the continuity of this bridge as to continuous current, a transmitting-telephone $a^2$, and a receiving-telephone $a^3$, together with a switch $a^4$, constructed to close the circuit of the line through the telephones when the switch is relieved from the weight of the receiving-telephone. The line conductors 1 and 2 extend to a switchboard in a central office, where they are connected with a spring-jack $b$ and with terminals of the windings of a signal-controlling relay $c$. After traversing the windings of this relay they are led to the poles of a battery $d$. The spring-contacts of the spring-jack $b$ coöperate with their contact-anvils to break these extensions of the line conductors to the relay when a plug is inserted into the spring-jack. The switch-contacts of the relay $c$ control a local circuit 3, which includes a signal-lamp $e$, which is associated with the spring-jack of the line and represents the line in the switchboard. The usual connecting-plugs $f$ and $f'$ are provided in the switchboard for uniting the spring-jacks of two lines. Each plug has two line-contacts, which are constructed to register with the line-springs of a spring-jack into which it may be inserted and a sleeve $g$ to make connection with a thimble $h$ in the spring-jack.

The line-contacts of the plugs of a pair are united through conductors 4 and 5, which constitute the plug-circuit. The usual calling-key $i$ for looping a source of calling-current into circuit with plug $f'$ and a listening-key $k$ for bringing the operator's telephone into connection with the plug-circuit are associated with the plugs. Wires 6 and 7 lead from conductors 4 and 5, respectively, to the poles of the battery $d$. These wires include the two windings of a relay $l$, which controls a local circuit, including a clearing-out signal $m$, the appliance being adapted to cause the illumination of the clearing-out signal when the relay becomes inert. Another relay $n$ is interposed in the conductor 5 of the plug-circuit between the point of connection therewith of wire 7 and the plug $f'$. This relay controls a supervisory signal $o$, which is associated with the plug $f'$, being arranged to close a local circuit 8 9, including the signal, when the relay is inert.

The appliances so far described constitute a usual and well-known system of circuit connections for operating automatic signals. In associating my present invention with these appliances an auxiliary counter-controlling magnet $p$ is interposed in a ground branch 10 from a contact $h$ of the spring-jack of each line. This electromagnet controls an armature and pivoted lever $p'$, which plays between contact-points $p^2$ $p^3$ and which controls through suitable mechanism the counting or registering wheel $p^4$. The normal resting contact-point $p^2$ of the relay is connected to ground. The alternate contact $p^3$ is connected through a battery $q$ to ground. The lever $n'$ of relay $n$ being grounded through conductor 9, including battery $r$, the forward contact of this relay is connected by a wire 12 with the sleeve $g$ of plug $f$. From this conductor 12 an earth branch is led, which includes a resistance-coil $s$. Thus the armature of the relay oscillating between its back and forward contact-points closes the circuit of battery $r$ alternately to the conductor 8 to light the lamp $o$ and to the wire 12, terminating in the plug.

The operation of the system, including the counting mechanism, is as follows: A subscriber requiring connection with another removes his receiving-telephone from its switch for use. This act permits current from battery $d$ to flow in the line, which excites the relay $c$ and displays the line-signal $e$. The operator answering inserts plug $f$ in the spring-jack of the line and brings her telephone into connection with the plug-circuit to learn the subscriber's order. The insertion of the plug in the spring-jack cuts off the connection of the line with the relay, and thus permits the extinction of the lamp $e$. The current created in the conductors of the plug-circuit by battery $d$ causes the excitement of relay $l$ and prevents the display of the clearing-out signal $m$. In completing the connection the operator inserts the plug $f'$ into the spring-jack of the line called for and rings the bell at the station of that line by means of key $i$ in the usual way. It will be observed that the insertion of the calling-plug into the spring-jack of the called line does not complete any connection with the counting mechanism of that line. When the subscriber called responds to the signal and removes his telephone from its switch for use, the relay $n$ attracts its armature and connects the battery $r$ to the conductor 12, whereby current is supplied through the magnet $p$. This magnet attracting its armature operates the registering or counting mechanism $p^4$ and at the same time brings its armature-lever into connection with battery $q$. This latter battery now has a circuit through the magnet $p$ and through the resistance-coil $s$ to earth. Hence subsequent movements of the armature of relay $n$ cannot materially affect the current through the magnet $p$. It will be understood that magnet $n$ is responsive to each act of the subscriber at the called station in replacing his telephone on its switch or removing it therefrom, each replacement of the telephone being signalized by the lighting of the lamp $o$. The response of the called subscriber is registered but once by the connection-counter, however. When both subscribers replace their telephones on their switches, the currents through both relays $l$ and $n$ are interrupted and both lamps $m$ and and $o$ become lighted. The lighting of the clearing-out signal $m$ is a signal for disconnection and is followed by the removal of plugs $f$ and $f'$ from the spring-jacks of the lines. The removal of plug $f$ breaks the connection between wires 10 and 12, and thus interrupts the current from battery $q$ through magnet $p$. Hence this magnet releases its armature, which falls back in readiness to register a new completed connection.

It will be obvious that the operation of the connection-counter by the telephone-switch of the called line is not an essential matter. It might be operated equally well by any other appliance automatically or necessarily operated in the use of the station-telephone and acting to change the character or strength of current in the line to affect a magnet connected with the line at the central office. Similarly numerous other arrangements of the mechanism and the circuits thereof in the switchboard might be made without departing from the spirit of the invention.

The following claims define the invention.

1. The combination with two telephone-lines and means for uniting them, of a connection-counter associated with one of the lines, circuit connections of the said counter and means at the substation of the other line for rendering said circuit connections operative to actuate the counter, as described.

2. The combination with two telephone-lines and means for uniting them, of a connection-counter associated with one of the lines, a magnet controlling the counter connected with the other line and responsive to current therein, and a switch at said second-mentioned line actuated in the use of the telephone at the station thereof and determining the flow of current in the line to control the said magnet, as described.

3. The combination with two telephone-lines, a connection-socket for each line and plugs and a plug-circuit uniting the sockets, of a connection-counter permanently associated with one line having a controlling-magnet, means for producing current in the called line controlled by a switch, and circuit connections including the said counter-controlling magnet extended through the agency of the plug and socket of the corresponding line to bring said magnet under the control of current in the called line, as described.

4. The combination with two telephone-lines, a switch for each line at the substation and means for producing current in the line controlled by the switch, and link conductors for uniting the lines, of a connection-counter associated with each line and circuit connections closed in the operation of uniting the lines by means of said link conductors adapted to bring the counter-controlling magnet of one line into association with the other line to respond to current therein, substantially as described.

5. The combination with two telephone-lines, sockets for the lines, plugs and a plug-circuit for uniting the sockets, the lines having means at their stations for determining the flow of current in the line-circuits during the use of the telephones, of a connection-counter for each line and a magnet controlling the counter, a magnet connected with the called line and responsive to current therein, and local circuit connections including the magnet of the counting mechanism and controlled jointly by said magnet in connection with the called line and by registering switch-contacts of the plug and socket of the calling-line, substantially as described.

6. The combination with two telephone-lines, means for uniting them, and means for producing current in each line during the use of the corresponding telephone, of a connection-counter permanently associated with one line, a magnet controlling the counter connected with the circuit of the other line and responsive to current therein, mechanism actuated by said magnet in its first movement adapted to prevent subsequent actuation of the counter, and means for rendering said mechanism inoperative, as described.

7. The combination with two telephone-lines, means for producing current in the lines during their use, sockets for the lines, and plugs and a plug-circuit for uniting the sockets, of a connection-counter associated with each line, an actuating-magnet for the counter and circuit connections including the magnet completed through registering contacts of the answering-plug and the spring-jack into which it is inserted, a relay connected with the called line responsive to current therein controlling the local circuit, and means actuated in the first response of said relay adapted to prevent subsequent breaking of the local circuit excepting at said plug and socket, as described.

8. The combination with two telephone-lines and a switch at each station to close the circuit during the use of the telephone, a socket for each line, an answering-plug in one of the sockets, a calling-plug in the other socket, a plug-circuit uniting the plugs, and a source of current in a bridge of the united circuits, of a connection-counter associated with the calling-line having a controlling-magnet, a local circuit including the said controlling-magnet and completed in registering contacts of the answering-plug and socket, a relay connected in the circuit of the called line between the source of current and the station thereof controlling the local circuit, and switch-contacts actuated in the closure of said local circuit closing circuits adapted to prevent subsequent actuation of the said controlling-magnet, whereby the response of the called subscriber causes the operation of the counter, as described.

9. The combination with two telephone-lines, spring-jacks for the lines, an answering-plug and a calling-plug for making connection with the spring-jacks, and a plug-circuit uniting the plugs, of a connection-counter associated with one of the lines, circuit connections with the answering-plug closed in registering switch-contacts of the said plug and a spring-jack adapted to actuate the counter; whereby the counter of the answered line alone is operated, as described.

In witness whereof I hereunto subscribe my name this 24th day of October, A. D. 1902.

FRANK R. McBERTY.

Witnesses:

EDWIN H. SMYTHE,
DUNCAN E. WILLETT.